Patented June 19, 1934

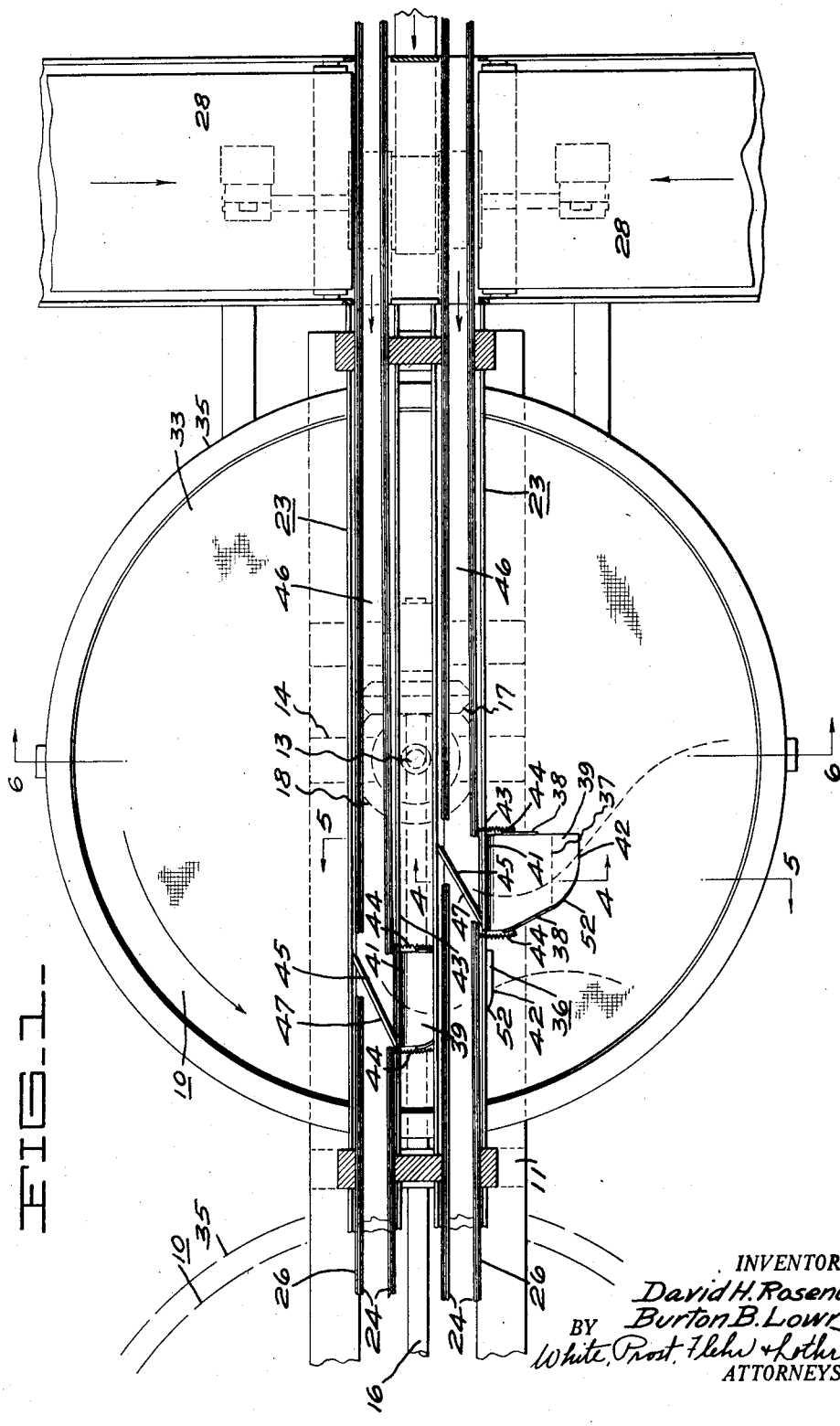

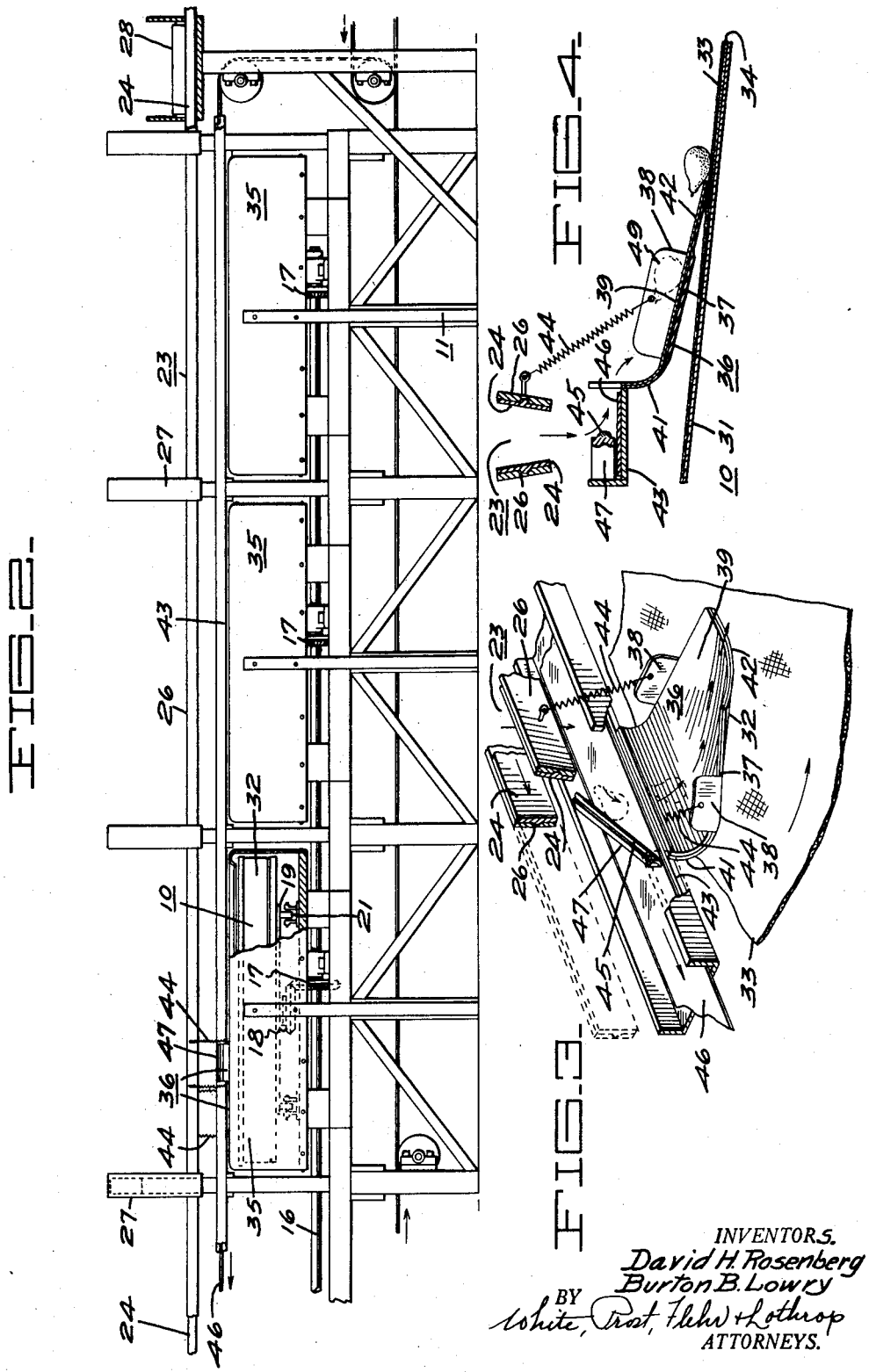

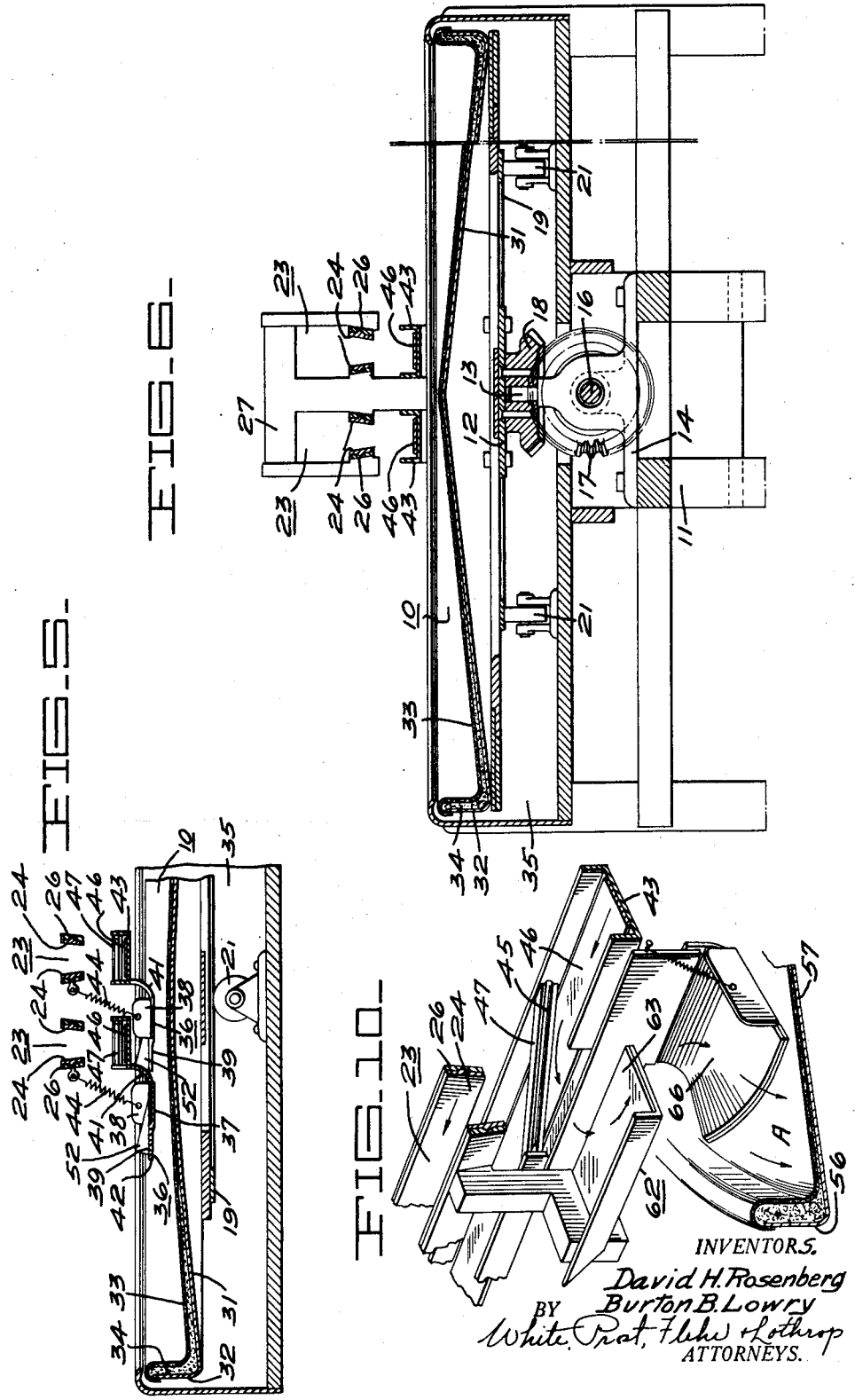

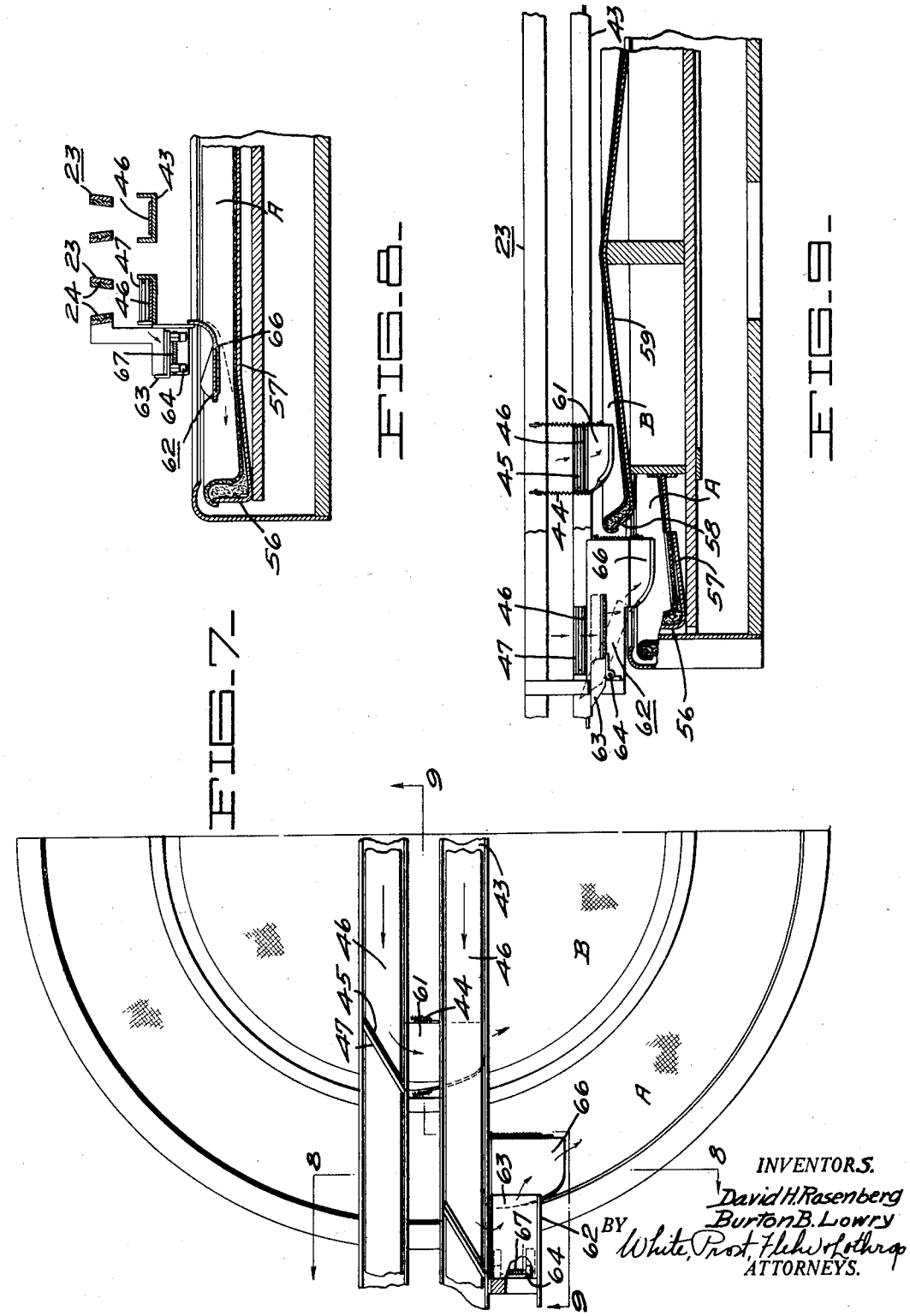

1,963,504

UNITED STATES PATENT OFFICE 1,963,504

FRUIT HANDLING MACHINE

David H. Rosenberg and Burton B. Lowry, Medford, Oreg.

Application March 19, 1930, Serial No. 437,033

4 Claims. (Cl. 209—71)

This invention relates generally to fruit handling machines, particularly machines utilized in fruit packing plants for distributing the fruit in such a manner that it is available to a plurality of packers.

In fruit packing plants, it has been common to utilize a long continuous table to which fruit is delivered according to sizes or according to some other classifying method. A plurality of packers along this table then pick up the fruit from the table and pack it into suitable crates or cartons for shipment to the trade. Machines of this character which have been developed in the past have been characterized by the fact that the packers must frequently reach a considerable distance to pick up the fruit from the table, thus adding considerably to the actual work of packing and decreasing the overall efficiency of the plant. Further, prior machines have frequently handled the fruit in such a manner as to cause injury, particularly where the fruit is comparatively delicate, such injury being generally caused by the fact that the fruit is not delivered to the edges of the tables but must be scooped towards the edges by the packers to within convenient packing distance.

It is a general object of the present invention to devise a machine of the above character which will facilitate the work of the packers, and which will make possible a relatively high overall capacity and efficiency compared to the amount of floor space required.

It is a further object of the present invention to generally improve upon the construction of fruit handling machines whereby injury to the fruit is obviated.

It is a further object of the present invention to devise improved means for transferring fruit to a table from which the fruit is to be packed.

Further objects of the present invention will be apparent from the following description in which certain embodiments of the invention are described in conjunction with the accompanying drawings. It is to be understood that the appended claims are to be accorded a range of equivalents consistent with the state of the prior art.

Referring to the drawings:

Figure 1 is a plan view illustrating a portion of a machine incorporating the present invention.

Fig. 2 is a side elevational view of the machine as shown in Fig. 1.

Fig. 3 is a detail view shown in perspective, illustrating the manner in which fruit is delivered from a sizing or equivalent machine, to one of the tables of our device.

Fig. 4 is a cross sectional detail taken along the line 4—4 of Fig. 3.

Fig. 5 is a cross sectional view taken along the line 5—5 of Fig. 1.

Fig. 6 is a cross sectional view taken along the line 6—6 of Fig. 1.

Fig. 7 is a partial plan view of a machine illustrating a modification of the invention.

Fig. 8 is a cross sectional view taken along the line 8—8 of Fig. 7.

Fig. 9 is a cross sectional detail taken along the line 9—9 of Fig. 7.

Fig. 10 is an enlarged detail of the take-off device 62 shown in Figs. 8 and 9.

The machine as illustrated in Figs. 1 to 6 inclusive, of the drawings, consists of a plurality of horizontal tables 10, which can be installed in any convenient position relative to each other, but which in this instance have been shown positioned side by side and extending in one direction. While certain features of our invention can be incorporated in a single table a number of tables are preferably employed, the number dependent upon the number of sizes into which the fruit is classified. These tables are supported at a suitable elevation from the floor by means of a support structure 11. To permit the tables to be continuously rotated about vertical axes, each table has been shown provided with a bearing member 12 cooperatively associated with an upright pivotal shaft 13, this shaft being in turn supported by a suitable structure 14. A driven shaft 16 runs the length of the tables and is provided with a plurality of bevel gears 17. These bevel gears are arranged to engage bevel gears 18 connected to the bearing members 12. For additional support, the lower sides of tables 10 can be provided with circular tracks 19, (Fig. 6), which are adapted to rest upon rollers 21.

Tables 10 are of relatively large diameter, say about 8 feet, so that a plurality of packers can be conveniently positioned about the same. It is the function of these packers to pick up the fruit from the table, and pack it into suitable crates or cartons. The several tables are preferably associated with means serving to sort the fruit into different sizes, so that each table receives fruit within certain size limits. Duplicating sizing devices are indicated generally at 23 and are each formed by a pair of traveling diverging belts 24. Belts 24 are restrained by suitable guides 26 which in turn are carried by a suitable supporting frame 27. Belts 24 extend the length of the line of tables, and are made of a material having a surface such that the fruit is not injured by contact with the same. For delivering fruit to the sizers 23, we have shown belt conveyors 28 extending laterally from the sizers at one end of the lines of tables. Fruit placed upon the conveyors 28, which generally has been washed and dried, is deposited upon the sizing belts 24, and is carried along by these belts over the tables 10. At various points along the path of movement of the fruit, the distance between the belts 24 becomes sufficient to permit the fruit to drop down between the belts. In place of a sizer such as described above we can employ other sizing means such as the "Cutler" apparatus, which would trip fruit at a given spot by weight and deliver the same to the tables.

The fruit as sized by the devices 23 is delivered to the various tables 10. If the tables 10 were constructed with flat bottoms, it is apparent that a packer might be required to reach over the table a considerable distance to pick up the fruit. In order to cause the fruit to take a position upon the tables so that it is always readily accessible to the packers, we preferably provide means whereby the fruit is caused to continually progress towards the outer edges of the tables. To form means of this character, each table is provided with a conical shaped bottom wall 31, as shown in Fig. 6, the outer periphery of this bottom wall 31 being connected to a circular side wall 32. The surfaces of the tables which may come into contact with the fruit are preferably provided with a suitable covering 33 of cloth or rubber, to obviate injury to the fruit. Padding material 34 is preferably interposed between the covering 33 and the more rigid material of which the bottom and side walls 31 and 32 are constructed. A circular guard 35 is preferably arranged about the side wall 32, to preclude accidental contact with the rotating parts of the tables. The angle at which bottom wall 31 is disposed will of course depend upon the character of fruit being handled. In any event it should be sufficient to cause an article of fruit placed upon the same to roll toward the outer edge, or towards side wall 32. However the angle should not be sufficient to cause fruit to roll towards the outer edge with considerable momentum, such as might cause injury to the fruit upon striking the outer side wall 32.

For depositing the sized fruit upon the table, we provide what can be termed "take-off" devices which have been designated generally at 36. As shown in detail in Figs. 3 and 4, each of these devices is in the form of a chute structure made of a piece of sheet metal 37, having its ends bent to form side portions 38. To prevent the fruit from coming into contact with metal surfaces, which might cause injury, the metal sheet 37 is shown covered with sheets 39 of resilient material, as for example soft vulcanized rubber. Rubber sheets 39 are extended and vulcanized or adhesively secured together beyond the edges of metal sheet 37, so as to form a resilient hinge portion 41 and a resilient edge portion 42. Hinge portion 41 is connected to a suitable fixed support 43, while flap portion 42 serves to deliver the fruit to the bottom wall 31 of the corresponding table 10. Preferably a resilient support is provided in addition to the resilient hinge portion 41. Such a support can be formed by springs 44 having their upper ends connected to a convenient fixed support and having their lower ends connected to side portions 38. It is apparent that a suitable counterweight might be employed in place of springs 44 or resilient spring means might be incorporated as a part of the chute structures.

Extending immediately below each pair of sizing belts 24, we provide conveyor belts 46, which are retained by suitable guides or supports 27. Belts 46 move in the same direction as the sizing belts 24. Adjacent each take-off device 36, we provide a relatively fixed bar or equivalent member 47, arranged immediately above the corresponding belt 46, at an angle to the path of movement of the belt. A strip 45 of resilient material extends across one face of this bar. Fruit being moved along by belt 46 strikes bar 47 and is thereupon rolled off the belt 46 upon the take-off device 36. The tension of springs 44 is preferably sufficient to normally lift the associated take-off device 36 a certain distance above the adjacent portion of bottom wall 31. When an article of fruit 49, as for example a pear, is removed from the associated conveyor 46 and caused to drop down over the hinge portion 41, the weight of the fruit is sufficient to cause the device to sag so that it assumes an angle, as shown in Fig. 4, sufficient to cause the fruit to roll down the device and off onto the bottom wall 31. When the device 36 is not weighted down with fruit, portion 42 is raised a certain distance from the surface of the table, say two or three inches.

It may be explained that the preferred form of each take-off device 36 described above is characterized by the fact that it tends to float above the table by virtue of the resilient portion 41 and the resilient supporting springs 44. Portion 41 drops the fruit a substantial distance, but its resilient character and cushioned surface precludes bruising. Should fruit pile upon the table the device rides over the fruit without injuring the fruit previously delivered, and can still function to properly deliver additional fruit. When the table contains considerable fruit the take-off device tends to deliver fruit selectively, that is it tends to hold back fruit delivered to it while dragging over fruit upon the table and to deliver fruit to the table to fill voids when fruit upon the table permits the device to swing downwardly. Such selective delivery of fruit insures relatively uniform distribution upon the table. The resilient nature of portion 41 also prevents fruit piled upon the table from being bruised or injured by coming into contact with this portion during rotation of the table, since as the fruit piles upon and passes under the device 36, the main portion of the device can pull away or drag out from support 43, thus automatically decreasing the drop normally afforded by portion 41. Portion 41 also substantially decreases the vertical drop across the remaining portion of device 36, so that the fruit is not rolled upon the table too rapidly.

In addition to the features outlined above, it is also characteristic of the take-off devices 36, that they roll the fruit upon the table in a direction corresponding generally to the direction of rotation of the associated tables. Thus as illustrated by arrows in Figs. 1 and 3, the fruit is rolled upon the table 10 in a direction corresponding to the direction of rotation of the associated tables, and in a direction which is approximately tangential to the table. To insure such movement of the fruit, we preferably bend one corner portion 52 of each take-off device 36 upwardly, as shown in Fig. 3, in order to prevent the fruit from rolling directly toward the side wall 32. It may be explained at this time that if the fruit were delivered in such a direction that it would move directly towards the side wall 32, it might strike the side wall with sufficient force to cause injury.

While the mode of operation of our machine is believed apparent from the above detailed description, it can briefly be reviewed as follows: Fruit which has been washed and dried, and which may be of two general grades, is placed upon the conveyors 28, and delivered to the sizing belts 24. The fruit moves along the sizing belts 24 and is dropped thru these belts upon the lower conveyors 46, at points depending upon their sizes. After fruit is dropped upon the conveyors 46, they strike the next bar 47 within their path, and are shunted off to the corresponding take-off device 36. The fruit then rolls down this device and is delivered to the conical bottom 31 of the corresponding table 10. The fruit is delivered to each table relatively close to the outer edge thereof so that the fruit rolls only a short distance if it immediately progresses to the outer edge of the table. A number of packers are placed about each table 10, and these packers remove the fruit from the tables by hand, and place them in suitable cartons or crates. Normally the fruit will distribute itself about the outer periphery of the tables, in the manner shown in Fig. 1. If the rate with which fruit is delivered to any one table exceeds the capacity of the packers for any one interval, the fruit may accumulate or stack up towards the center of the table. However as the packers remove fruit from the outer periphery, the fruit upon the table tends to progress towards the outer edge, due to the conical bottom, so that the packers need not reach towards the center of the table.

In Figs. 7, 9 and 10 inclusive, we have shown a modification of the invention in which the table is divided into a plurality of annular storage spaces thus permitting segregating the fruit on one table into two grades. As shown in Figs. 7 and 9, these two compartments are designated A and B, compartment A being formed by circular side wall 56 and a conical bottom wall 57, and compartment B being formed by circular wall 58 and conical bottom wall 59. With this form of table, two take-off devices 61 and 62 are provided, which serve to transfer fruit from the conveyors 46 to the separate compartments B and A respectively. Take-off device 61 can be of a construction similar to that described with reference to Figs. 1 to 6 inclusive, while take-off device 62, because of the greater distance thru which the fruit must be lowered, can be formed in two or more steps. The first step can be formed by a chute structure 63 which is surfaced with a suitable material such as rubber, and which has its one end portion provided with a hinge connection 64 to a suitable fixed support. The second step is shown formed by chute structure 66 similar to the structure 36 previously described with the exception that chute structure 63 delivers the fruit to structure 66. Chute structure 63 is biased upwardly by means of a suitable spring 67, and as fruit is shunted off onto this structure from the associated conveyor 46, the chute swings downwardly under the weight of the fruit and causes the fruit to roll off upon the second structure 66. Structure 66 then likewise swings downwardly under the weight of the fruit and causes the fruit to roll off and to be delivered upon the bottom 57 of compartment A.

With a table construction such as shown in Figs. 7 to 9 inclusive, the fruit is preferably graded before it is delivered to the driving belts 24, and therefore compartments A and B receive fruits of different grades. The conical bottoms 57 and 59 cause the fruit to tend to progress towards the outer edges of both compartments, thus causing the fruit to be in a position readily accessible to the packers placed about the table.

We claim:

1. In a fruit handling machine, a circular table of sufficient diameter to accommodate a plurality of fruit packers around the same and having a peripheral side wall, means for continually rotating said table about an upright axis, said table having a bottom shaped conically at an angle sufficient to cause the fruit to continually tend to progress toward the outer edge thereof, fruit selecting means, and means for conveying fruit from said selecting means to said table, said last means serving to deliver fruit in a direction corresponding to the direction of rotation of the table.

2. In a fruit handling machine, a circular table of sufficient diameter to accommodate a plurality of fruit packers about the same, means for continually rotating said table about an upright axis, said table having a bottom shaped conically at an angle sufficient to cause the fruit to continually tend to progress toward the outer edge thereof and having an upstanding peripheral side wall, fruit sizing means associated with said table, and means for conveying fruit from said sizing means and for rolling said fruit upon the table in a direction corresponding to the direction of rotation of the table.

3. In a fruit handling machine, a circular table of a diameter sufficiently large to accommodate a plurality of packers about the same, a chute structure disposed above said table forming a path over which fruit can be rolled to the table, a stationary support to which one end of the chute structure is movably connected, resilient means for normally supporting the other free end of said structure, said resilient means permitting downward movement of said chute structure toward the table under the weight of fruit placed upon the same.

4. In a fruit handling machine, a circular table of a diameter sufficiently large to accommodate a plurality of packers about the same, a chute structure disposed above said table forming a path over which fruit can be rolled to the table, a stationary support, resilient means movably connecting one end portion of said structure to said support, resilient means for normally supporting the other free end of said structure, said last named resilient means permitting downward movement of the chute structure toward the table under the weight of fruit placed upon the same, both said resilient means permitting dragging of the chute structure over fruit upon the table.

DAVID H. ROSENBERG.
BURTON B. LOWRY.